United States Patent
Brown et al.

[11] Patent Number: 6,049,241
[45] Date of Patent: Apr. 11, 2000

[54] CLOCK SKEW CIRCUIT

[75] Inventors: Brian L. Brown; Roger D. Norwood, both of Sugar Land, Tex.

[73] Assignee: Texas Instruments Incorporated, Dallas, Tex.

[21] Appl. No.: 09/030,296

[22] Filed: Feb. 25, 1998

Related U.S. Application Data

[60] Provisional application No. 60/038,537, Feb. 28, 1997.

[51] Int. Cl.[7] ..................................................... H03K 3/86
[52] U.S. Cl. ........................ 327/295; 327/291; 327/271; 327/259; 327/261
[58] Field of Search ..................................... 322/236, 146, 322/261, 291, 295, 259, 239, 263, 271, 277

[56] References Cited

U.S. PATENT DOCUMENTS

| | | |
|---|---|---|
| 4,943,787 | 7/1990 | Swapp ...................................... 327/295 |
| 5,389,831 | 2/1995 | Eisenstadt ................................ 327/295 |

Primary Examiner—Dinh T. Le
Attorney, Agent, or Firm—Robert N. Rountree; Michael K. Skrehot; Richard L. Donaldson

[57] ABSTRACT

A clock circuit including an input terminal (300) for receiving a clock signal and a first pulse generator (302) coupled to the input terminal. The first pulse generator is operable to generate a voltage pulse in response to a logic-low voltage to logic-high voltage transition of the clock signal. The circuit also includes a second pulse generator (304) coupled to the input terminal, the second pulse generator being operable to generate a voltage pulse in response to a logic-high voltage to logic-low voltage transition of the clock signal. A first clock deskewing circuit (306) is coupled between the first pulse generator and a first clock signal output terminal and a second clock deskewing circuit (308) is coupled between the second pulse generator and a second clock signal output terminal. The circuit may also include an OR logic circuit (310) coupled to the first and second clock signal output terminals, and a third pulse generator (312) coupled to the OR logic circuit, the third pulse generator having a third clock signal output terminal (314).

18 Claims, 5 Drawing Sheets

CLOCK SKEW CIRCUIT

This application claims priority under 35 U.S.C. §119(e)(1) of provisional application No. 60/038,537, filed Feb. 28, 1997.

FIELD OF THE INVENTION

This invention generally relates to electronic circuits, and more specifically to integrated circuits.

BACKGROUND OF THE INVENTION

In electronic devices such as synchronous dynamic random access memory circuits (SDRAMs), microprocessors, digital signal processors, and so forth, the processing, storage, and retrieval of information is coordinated with a clock signal. The speed and stability of the clock signal determines to a large extent the data rate at which a circuit can function. A continual demand exists for devices with higher data rates; consequently, circuit designers have begun to focus on ways to increase the frequency of the clock signal. In SDRAMs, it is desirable to have the data output from the memory synchronized with the system clock that also serves the microprocessor. The delay between a rising edge of the system clock (external to the SDRAM) and the appearance of valid data at the output of the memory circuit is known as the clock access time of the memory. A goal of memory circuit designers is to minimize clock access time as well as to increase clock frequency.

One of the obstacles to reducing clock access time has been clock skew, that is, the delay time between the externally-supplied system clock signal and the signal that is routed to the memory's output circuitry. This skew in the clock signal internal to the integrated circuit is caused by the delays incurred in the signal passing through the clock input buffer and driver and through any associated resistive-capacitive circuit elements. One solution to the problem of clock skew is the use of a synchronous mirror delay as described by T. Saeki, et al. in "A 2.5-ns Clock Access, 250-MHz, 256-Mb SDRAM with Synchronous Mirror Delay," IEEE Journal of Solid-State Circuits, vol. 31, No. 11, November 1996, pp. 1656–1665, and also by T. Saeki, et al. in "A 2.5 ns Clock Access 250 MHz 256 Mb SDRAM with a Synchronous Mirror Delay," 1996 IEEE International Solid-State Circuits Conference, pp. 374–375. The synchronous mirror delay (SMD) is a digital circuit that consists of two delay circuit arrays and one control circuit. The SMD detects the clock cycle from two consecutive pulses, generates a clock-synchronized delay, and eliminates the clock skew, all within two clock cycles.

One problem with the synchronous mirror delay is that with existing technology, the maximum frequency of operation is about 300 MHz. This is in contrast to phase-lock loop (PLL) and delay-lock loop (DLL) designs that have a theoretical maximum frequency closer to 1 GHz. But while PLLs and DLLs offer a higher possible clock frequency, they require several hundreds of clock cycles before skew can be eliminated. To compensate for the slow lock time, designers of systems that incorporate PLLs or DLLs keep these circuits active during the standby mode of the integrated circuit, thereby incurring the penalty of a high standby current. So, the ability to eliminate clock skew quickly and without excessive standby current make SMDs attractive, but the limitations on the maximum frequency of operation of these circuits will become more important as the data rates and operating speeds of future generations of integrated circuits increase.

SUMMARY OF THE INVENTION

In accordance with a preferred embodiment of the invention, there is disclosed a clock circuit. The circuit includes an input terminal for receiving a clock signal and a first pulse generator coupled to the input terminal. The first pulse generator is operable to generate a voltage pulse in response to a logic-low voltage to logic-high voltage transition of the clock signal. The circuit also includes a second pulse generator coupled to the input terminal, the second pulse generator being operable to generate a voltage pulse in response to a logic-high voltage to logic-low voltage transition of the clock signal. A first clock deskewing circuit is coupled between the first pulse generator and a first clock signal output terminal, and a second clock deskewing circuit is coupled between the second pulse generator and a second clock signal output terminal. The circuit may also include an OR logic circuit coupled to the first and second clock signal output terminals, and a third pulse generator coupled to the OR logic circuit, the third pulse generator having a third clock signal output terminal.

An advantage of the inventive concept is that it provides a very high frequency, internal clock signal that is deskewed relative to an external clock signal. The inventive concept is particularly advantageous when incorporated in a synchronous DRAM integrated circuit and provides for low clock access time. In today's computer applications, the typical microprocessor operates at a clock frequency of 200 MHz, for example, whereas the typical memory bus operates at only about 66 MHz. It is desirable that memory circuits be made to operate at a clock frequency comparable to that of the microprocessor to enable higher data transfer rates. The inventive concept addresses obstacles to closing the gap between microprocessor and memory speed.

BRIEF DESCRIPTION OF THE DRAWINGS

The foregoing features of the present invention may be more fully understood from the following detailed description, read in conjunction with the accompanying drawings, wherein.

DETAILED DESCRIPTION OF PREFERRED EMBODIMENTS

Figure 1:
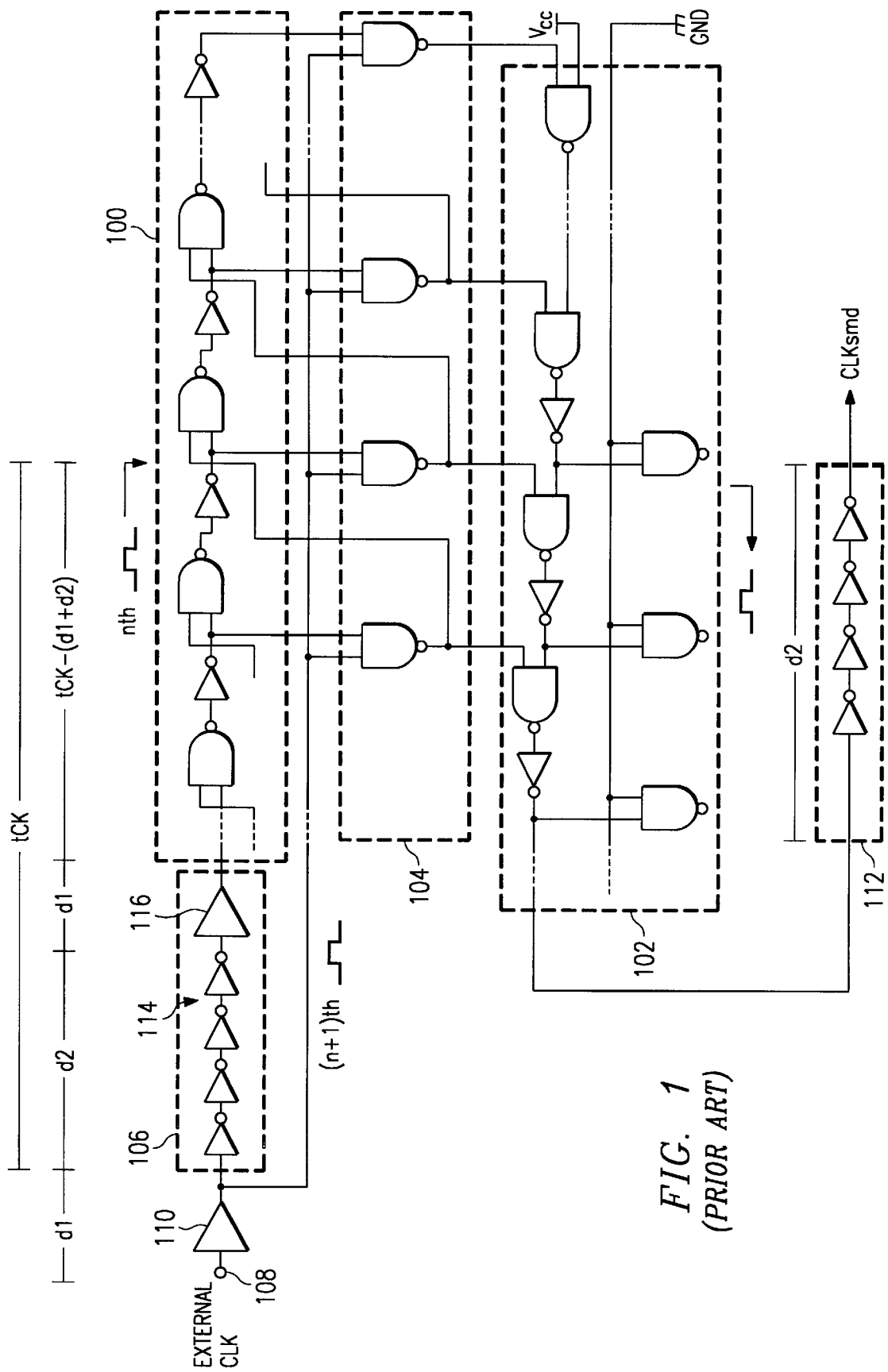
FIG. 1 is a schematic diagram of a prior art synchronous mirror delay circuit.

FIG. 1 is a schematic diagram of a prior art clock deskewing circuit known as a synchronous mirror delay for use in an integrated circuit such as a synchronous dynamic random access memory. It comprises a forward delay array (FDA) 100, a backward delay array (BDA) 102, a mirror control circuit (MCC) 104, and a delay monitor circuit (DMC) 106. An external clock signal is presented at the external clock terminal 108, which is connected to an input buffer 110. Clock driver 112 amplifies the clock signal from the BDA 102 to facilitate distributing the deskewed signal, CLKsmd, to the integrated circuit. Although series-coupled NAND gates and inverters form the FDA and BDA of the prior art synchronous mirror delay circuit, simpler delay elements such as resistors or metal lines could also be used, as could more complex logic gate delay circuits.

Figure 2:
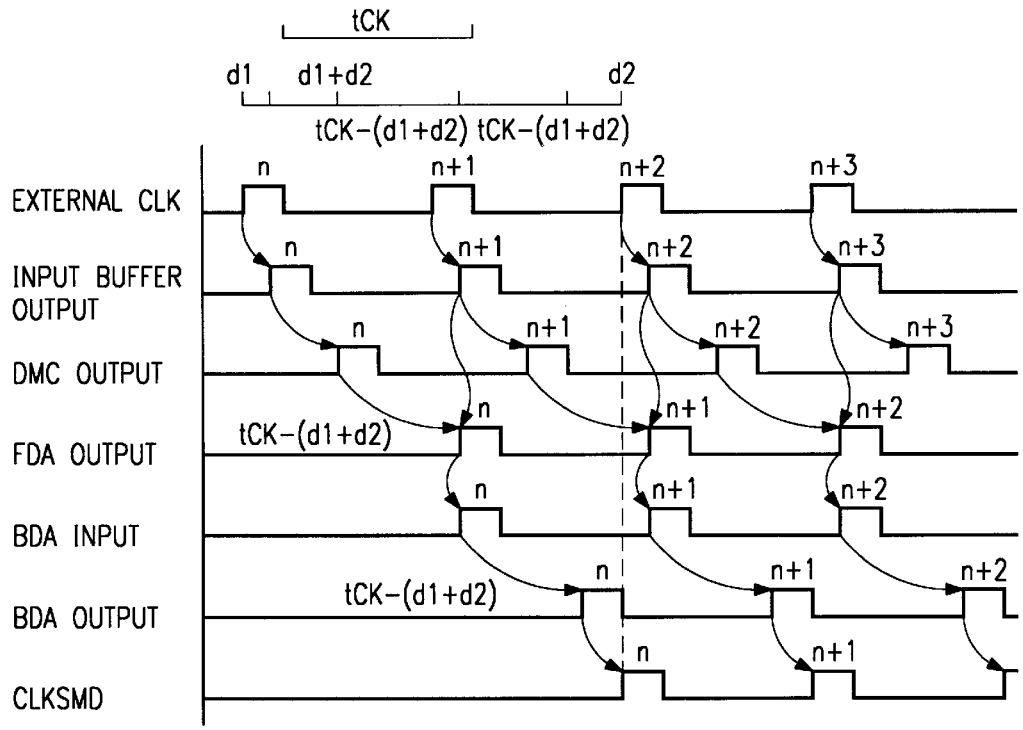
FIG. 2 is a prior art timing diagram of the circuit of FIG. 1.

The operation of the SMD is as follows. After an nth clock pulse passes through the input buffer 110, the DMC 106, and into the FDA 100, the (n+1)th clock pulse enters the MCC 104. The entry of the (n+1)th pulse into the MCC 104 transfers the nth pulse to the BDA 102. The nth pulse then travels back through the BDA the distance that it had traveled through the FDA prior to the transfer. The delay incurred in passing through the input buffer is denoted $d_1$, while the delay through the clock driver is $d_2$. Note that the DMC 106 comprises buffer 116 and driver 114 circuits to emulate the delay through input buffer 110 and clock driver 112. The time the pulse spends in the FDA is the clock cycle, $t_{CK}$, less the delay through the input buffer 110 ($d_1$) and the clock driver 112 ($d_2$). Therefore, when the nth pulse reaches the output of the BDA prior to entering the clock driver 112, it is advanced in time by $d_2$ compared to the (n+2)th pulse just entering at terminal 108. The clock signal CLKsmd at the output of clock driver 112 is therefore aligned with the (n+2)th pulse, thus meaning that clock skew has been eliminated. FIG. 2 is a timing diagram showing the elimination of the skew. If despite efforts at emulating all of the delay elements in the delay monitor circuit 106, the signal CLKsmd does not align with the (n+2)th pulse, the delay $d_2$ of the clock driver 112 can be adjusted so that the signals do align. This adjustment may be accomplished by adding or removing inverter stages in the clock driver 112, for example, by including metal layer options or fuses in the circuit layout design.

While the SMD circuit shown in FIG. 1 offers quick clock access time, that is, a deskewed clock signal within two clock cycles, it is capable of a maximum frequency of operation of only about 300 MHz. This is because the speed of the SMD is essentially limited to the rate at which a signal pulse can travel the loop formed by the DMC 106, the FDA 100, and the BDA 102. The fastest that a pulse can travel this loop is approximately 3 ns, which corresponds to a frequency of about 300 MHz.

Figure 3:
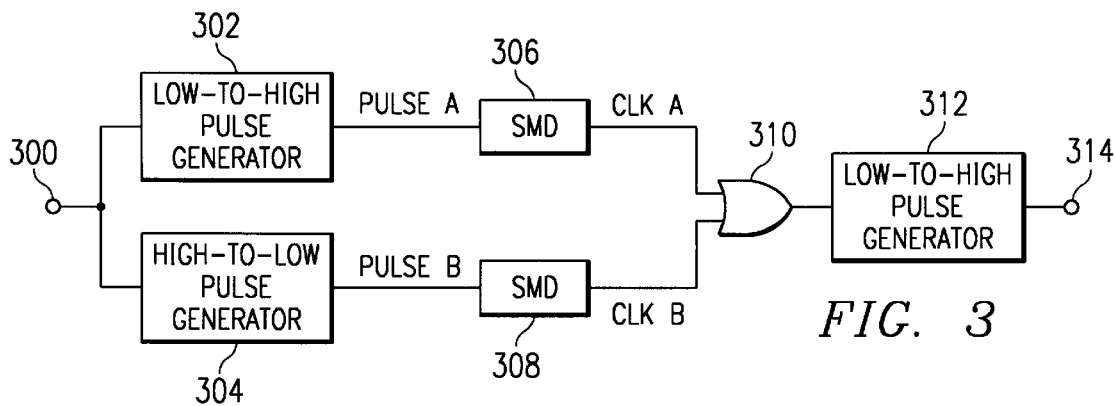
FIG. 3 is a generalized schematic diagram of a first preferred embodiment of the invention.

A preferred embodiment of the invention is shown in FIG. 3. It comprises external clock input terminal 300 coupled to low-to-high pulse generator 302 and high-to-low pulse generator 304. The pulse generators are coupled to synchronous mirror delay circuits 306 and 308. One skilled in the art will appreciate that clock deskewing circuits other than SMDs could be used. Examples include phase-lock loops or delay lock loops. The outputs of the SMDs are then inputs to OR gate 310, the output of which is coupled to another low-to-high pulse generator 312. In this embodiment OR gate 310 comprises a NOR gate and an inverter, but one skilled in the art may appreciate that other configurations of logic circuitry will accomplish the same function. The output of pulse generator 312 is the internal clock terminal 314.

While the delay caused by the pulse generators 302, 304 and 312 is small relative to that caused by buffers and clock drivers, the SMD can be modified to correct for such delays by including a comparable delay element in the delay monitor circuit (such as element 106 in FIG. 1) of the SMD. For example, in the circuit of FIG. 3 a delay element producing a delay approximating that caused by pulse generator 302 may be included in the delay monitor circuit of the SMD 306. Similarly, a delay element producing a delay approximating that caused by pulse generator 304 may be included in the delay monitor circuit of the SMD 308. Both SMD circuits 306 and 308 could be modified to include delay elements in their respective delay monitor circuits to approximate the delay caused by OR gate 310, pulse generator 312, and any other source of delay that may occur between the internal clock terminal 314 and the destination of the clock signal. In a memory circuit, the destination of the clock signal might include the output buffer and associated circuitry.

The circuit of FIG. 3 may be incorporated in an integrated circuit such as a synchronous dynamic random access memory, a microprocessor, or a digital signal processor, for example. Additionally, the circuit could be a part of a clock circuit, the output of which is distributed to other circuits in a clock-synchronized system.

Figure 4:
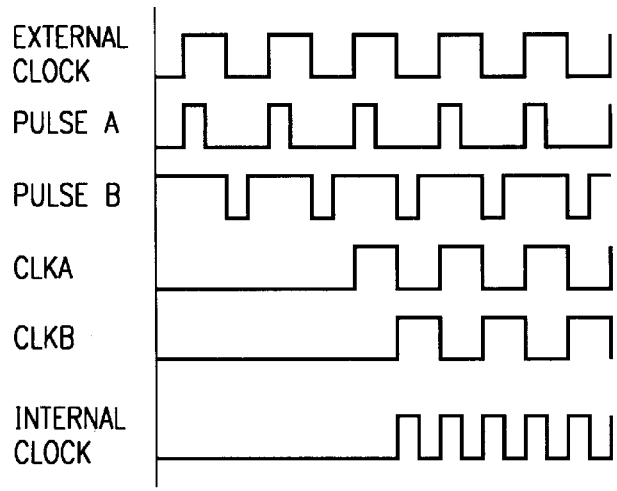
FIG. 4 is a timing diagram of the circuit of FIG. 3.

FIG. 4 is a timing diagram of the operation of the circuit shown in FIG. 3. Each time the external clock signal transitions from a logic low to a logic high, the pulse generator 302 generates a logic high pulse, denoted "Pulse A" in FIGS. 3 and 4. Pulse A enters SMD 306 and approximately two external clock cycles later, a logic high pulse is output as the signal CLK A. The logic high (CLK A) is then passed by OR gate 310 to pulse generator 312. In response to the CLK A logic high, pulse generator 312 outputs a logic high to the internal clock terminal 314 that is ideally perfectly aligned with the corresponding high-going external clock edge. Similarly, each time the external clock signal transitions from a logic high to a logic low, pulse generator 304 generates a logic high pulse, denoted "Pulse B" in FIGS. 3 and 4. Pulse B enters the SMD 308 and approximately two cycles later a logic high pulse is output as the signal CLK B. The logic high (CLK B) is then passed by OR gate 310 to pulse generator 312. In response to the CLK B logic high, pulse generator 312 outputs a logic high to the internal clock terminal 314 that is ideally perfectly aligned with the corresponding low-going external clock edge. The result, shown in FIG. 4, is an internal clock signal at twice the frequency of the external clock signal.

Figure 5:
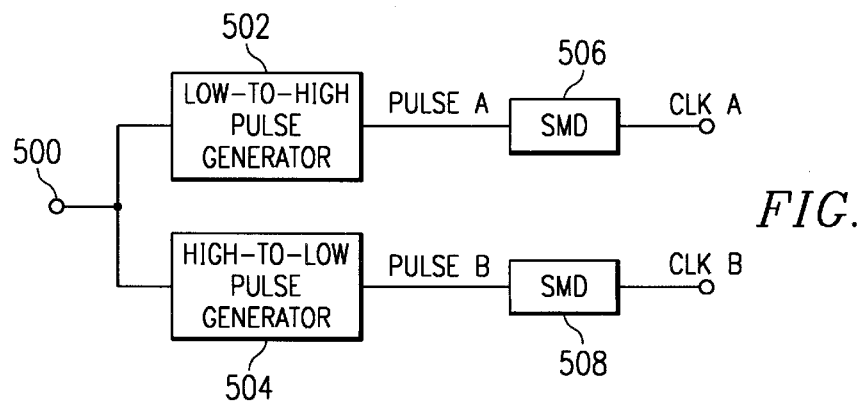
FIG. 5 is generalized block diagram of a second preferred embodiment of the invention.
Figure 6:
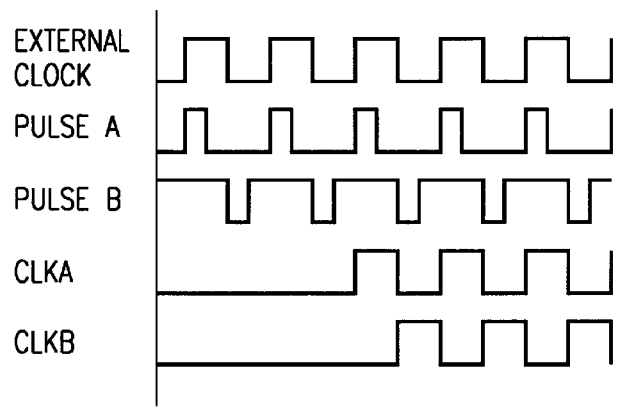
FIG. 6 is a timing diagram of the circuit of FIG. 5.

A second preferred embodiment of the invention is shown in FIG. 5. It is similar to the circuit of FIG. 3, but lacks the OR logic function and the final pulse generator. The second preferred embodiment circuit comprises external clock input terminal 500 coupled to low-to-high pulse generator 502 and high-to-low pulse generator 504. The pulse generators are coupled to synchronous mirror delay circuits 506 and 508. The outputs of the SMDs 506 and 508 provide complementary internal clock signals, CLK A and CLK B, both operating at the same frequency as an external clock signal applied at terminal 500, but out of phase by 90°. The simultaneous use of CLK A and CLK B can achieve the factor of two increase in clock frequency that is achieved in the first embodiment circuit, since a high-going clock edge is generated twice as often as that provided by the external clock signal. FIG. 6, the timing diagram for the circuit of FIG. 5, makes clear the factor of two increase in the frequency of high-going clock edges.

Figure 7:
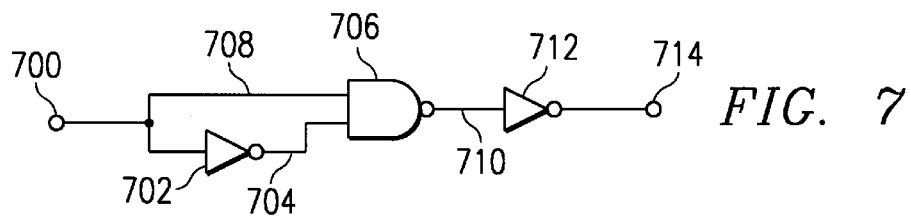
FIG. 7 is a schematic diagram of a low-to-high pulse generator that may be used with the circuits of FIGS. 3 and 5.

FIG. 7 shows an example of a low-to-high pulse generator. In the circuit's steady state, the signal at input terminal 700 is a logic low, which inverter 702 converts to a logic high at the input line 704 to NAND gate 706. Since the signal on line 708 is a logic low, the NAND gate output at line 710 is a logic high, which is converted by inverter 712 to a logic low at the output terminal 714. But when the signal at terminal 700 changes to a logic high, NAND gate 706 drives the signal on line 710 to a logic low. The logic low on line 710 is converted by inverter 712 to a logic high at the output terminal 714. This state persists only until inverter 702 has time to convert the logic high signal at terminal 700 to a logic low at line 704, after which the logic low on line 710 becomes a logic high, and the logic high at terminal 714 becomes a logic low. Thus, the time (typically on the order of 1 ns) required for the inverter 702 to invert the signal appearing at the input terminal 700 defines the pulse length of the circuit. The pulse length may be altered by varying the characteristics of, or number of, the inverter 702 at the input of the NAND gate 706. For example, using three inverters instead of the one shown as inverter 702 results in a longer pulse. The skilled artisan will appreciate that the pulse generator could also be configured to provide a shorter pulse. For example, a shorter pulse could be generated using the same circuit by modifying the transistors that form the inverter to decrease the time required for transition between logic states. Specifically, increasing the size of the transistors in the inverter will speed the transition. If it is desired that the time of a particular transition (low-to-high for example) be decreased, the pull-up and pull-down transistors that make up the inverters could be sized differently.

Figure 8:
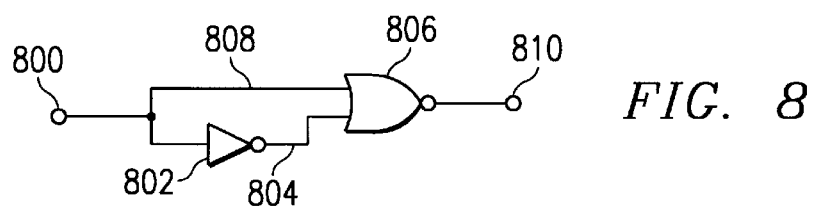
FIG. 8 is a schematic diagram of a high-to-low pulse generator that may be used with the circuits of FIGS. 3 and 5.

FIG. 8 shows a high-to-low pulse generator. In the circuit's steady state, the signal at input terminal 800 is a logic high, which inverter 802 converts to a logic low on line 804 at the input to NOR gate 806. Since the input to NOR gate 806 on line 808 is a logic high, the output of NOR gate 806 at terminal 810 is a logic low. But when the signal at terminal 800 changes to a logic low, NOR gate 806 drives the signal at terminal 810 to a logic high. This state persists only until inverter 802 has time to convert the logic low signal at terminal 800 to a logic high at line 804, after which the logic high at terminal 810 becomes a logic low. As discussed above with regard to the low-to-high pulse generator of FIG. 7, the pulse length generated by the circuit of FIG. 8 may be adjusted by varying the characteristics of, or number of, the inverter 802 at the input of the NOR gate 806.

Figure 9:
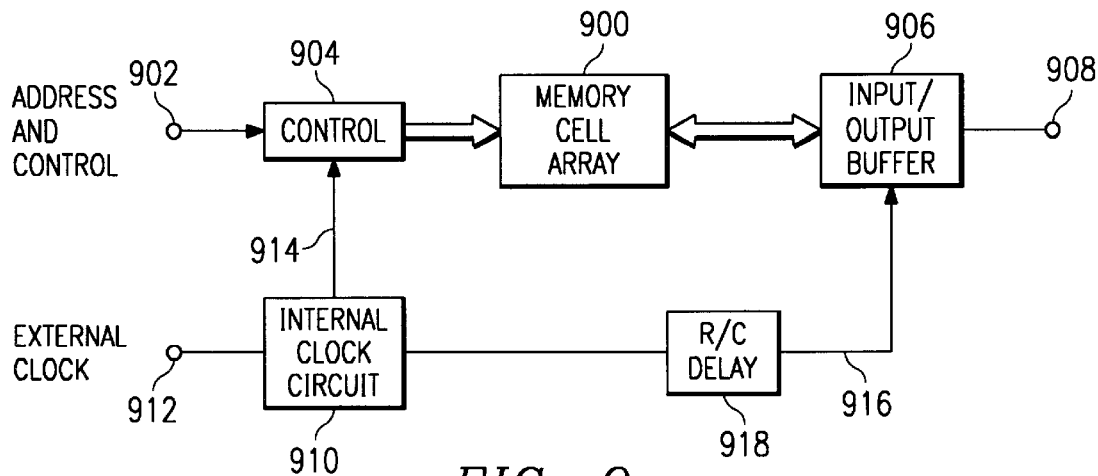
FIG. 9 is a block diagram of a third preferred embodiment memory circuit, which may incorporate the circuits of FIGS. 3 and 5.

FIG. 9 is a block diagram of a third preferred embodiment that may incorporate an internal clock circuit such as that described in the first and second preferred embodiments. The circuit of FIG. 9 represents an SDRAM having at its core the memory cell array 900. Address and control inputs are made at input terminal 902 and are processed by control circuit block 904. Data to be written into or read out of the memory cell array 900 passes through a data transfer circuit, which in FIG. 9 is the input/output buffer circuit block 906. Data appears at output terminal 908 either in preparation to be transferred into the memory cell array in a write operation or after data has been retrieved from the memory cell array during a read operation. Internal clock circuit 910 buffers and deskews the external clock signal presented at terminal 912. It may be desirable to use the deskewed clock signal for only certain operations in the circuit, to save power for example. For operations within the memory circuit that do not require a deskewed clock signal, shown in FIG. 9 as the decoding of addresses and retrieval of data from the memory cell array for example, a merely buffered and amplified version of the external clock is made available on line 914.

The deskewed clock signal provided by internal clock circuit 910 is used for operations in which synchronization with the external clock signal is desirable. For example, in FIG. 9 the output buffer circuit is controlled by the deskewed signal on line 916 to ensure that the data is output at terminal 908 with a minimum of clock access time. During data output modes, each successive clock pulse on line 916 enables a gate in the output buffer circuit block 906 that allows data to pass through the output buffer to the terminal 908. In contrast, the address and control operations performed by control block 904 are clocked by the merely buffered clock signal on line 914. Using the deskewed signal only for the control of output operations allows the internal clock circuit 910 to be deactivated during other operations to conserve power, for example.

The R/C delay block 918 represents delay caused by line lengths, for example, between the internal clock circuit 910 and the output buffer 906. The SMD in the circuit of FIGS. 3 and 5 can be modified to correct for the skew induced by this delay, or by similar delays, by adding a comparable delay element in the delay monitor circuit block of the SMD. The delay monitor circuit block is described as element 106 in the circuit of FIG. 1.

In SDRAM circuits, information such as row and column addresses and row and column enable signals typically enter the memory circuit by being held at the input of a buffer until the buffer is enabled with a clock signal, or they are passed through the buffer and stored on the rising edge of a clock signal in a latch. In either case, the set-up and hold time of the address or row or column enable signal supplied by an external source such as a microprocessor is dependent upon the skew between the externally-supplied system clock and the clock that is internal to the memory circuit. The address and enable data is supplied by a source that is synchronized by the external or system clock, while the clock signal that enables the input buffer or the latch is the internal clock signal. Therefore, the set-up and hold time of the address and row or column enable signals must extend long enough to cover the skew between the clock signals to ensure that the data is passed through the buffer or latched as desired.

Figure 10:
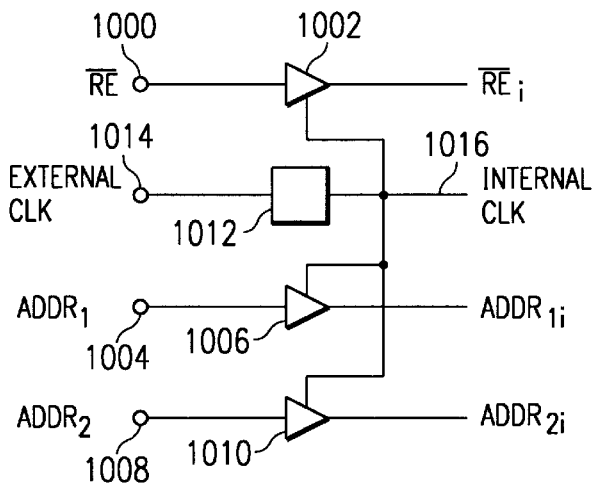
FIG. 10 is a schematic diagram of a fourth preferred embodiment input circuit.

The foregoing may be better understood by referring to a fourth preferred embodiment of the invention shown in FIG. 10. FIG. 10 is a simplified schematic diagram showing the input circuitry of an SDRAM. The circuit comprises a row enable input terminal 1000 coupled to a row enable buffer 1002; a first address terminal 1004 and a first address buffer 1006; and a second address terminal 1008 and a second address buffer 1010. The circuit also includes a clock deskew circuit 1012 coupled to external clock terminal 1014. The clock deskew circuit 1012 includes the first preferred embodiment circuit shown in FIG. 3, for example. The deskew circuit 1012 could alternatively include the second preferred embodiment shown in FIG. 5, a phase-lock loop, delay-lock loop, or similar circuit. In this embodiment, data is held on terminals 1000, 1004, and 1008 until buffers 1002, 1006, and 1010 are enabled by a clock pulse on line 1016.

Figure 11A:
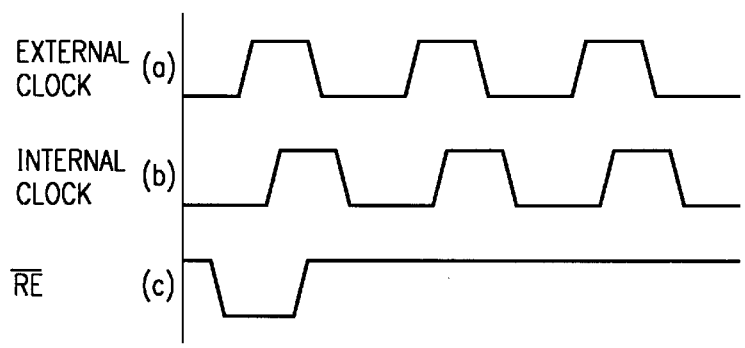
FIG. 11a is a timing diagram showing the effects of clock skew on control input signals for a memory circuit.
Figure 11B:
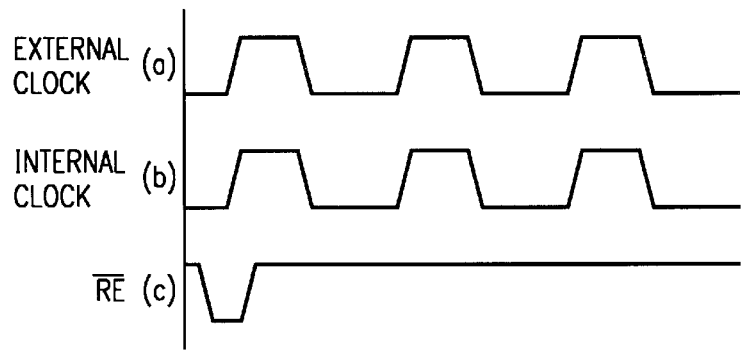
FIG. 11b is a timing diagram showing the benefits of using a deskewed clock signal for the entry of control, address, and data signals to a memory circuit.

Whereas in the embodiment shown in FIG. 9, the deskewed clock signal was used only in the output circuits of the memory device, the circuit of FIG. 10 uses a deskewed internal clock signal for the inputting of control and address signals. Using the deskewed signal to control more functions in the memory circuit might require that the deskew circuit remain active longer and consume more energy than if the deskewed signal is used selectively to control only the outputting of data, for example. But an advantage gained by using a deskewed internal clock signal to enable buffers 1002, 1006, and 1010 may be seen by comparing the timing diagrams of FIGS. 11*a* and 11*b*. In FIG. 11*a,* the clock deskew circuit 1012 in FIG. 10 is replaced with a simple buffer. Hence a delay or skew exists between the external clock signal in line (a) of FIG. 11*a* and the internal clock signal in line (b) of FIG. 11*a*. As a result of this skew, the row enable signal shown in line (c) for example, should be held low long enough to cover the rising edge of the internal clock signal. Indeed, the set-up and hold time may be long enough to occupy so much of the clock cycle as to prevent the use of a higher-frequency clock. In contrast, in the circuit of FIG. 10 where the clock deskew circuit is used, the internal clock (line (b)) is temporally aligned with the external clock (line (a)) as shown in FIG. 11*b*. Therefore, the set-up and hold time of the row enable signal (line (c)) can be made much shorter. This shorter set-up and hold time also facilitates the use of a faster clock signal if desired.

Figure 12:
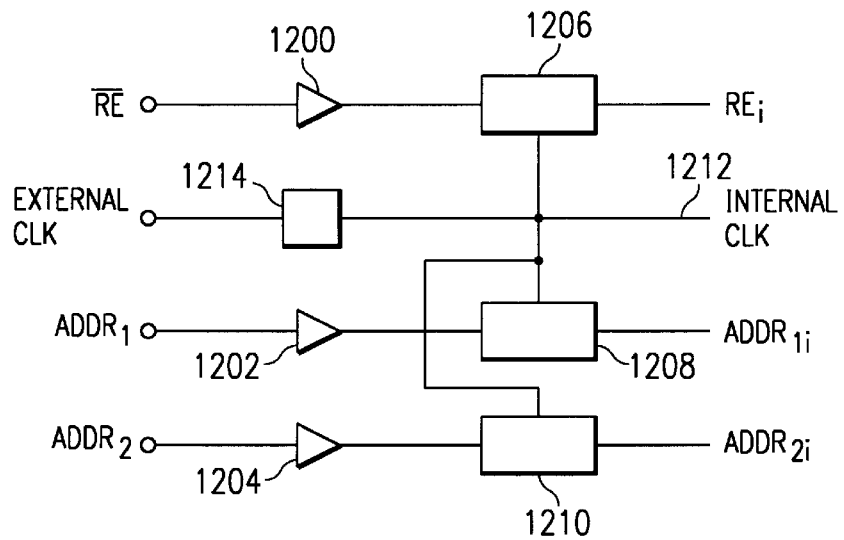
FIG. 12 is a schematic diagram of a fifth preferred embodiment input circuit.

A fifth preferred embodiment shown in FIG. 12 is similar to the embodiment shown in FIG. 10, but data passes through buffers 1200, 1202, and 1204 and is stored in latches 1206, 1208, and 1210 in response to an edge of the internal clock signal on line 1212. The advantages described above that are gained by deskewing the internal clock signal with deskew circuit 1214 apply to the circuit of FIG. 12 as well.

Figure 13:
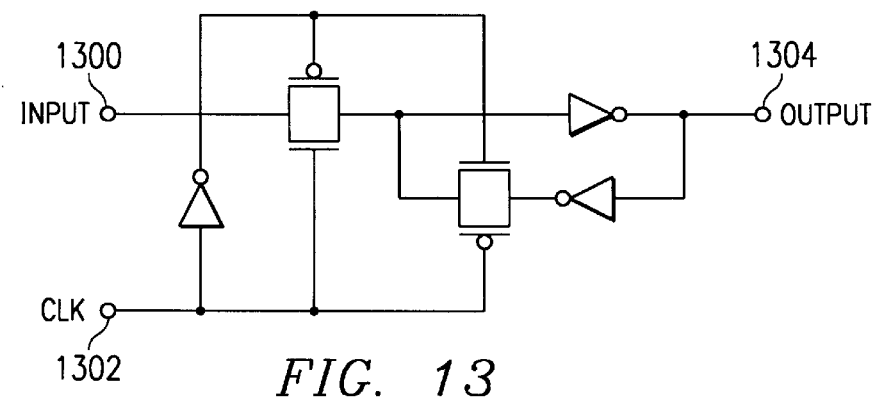
FIG. 13 is a latch circuit as may be used in the circuit of FIG. 12.

FIG. 13 is a latch circuit as may be used for the latches 1206, 1208, and 1210. The circuit stores the data appearing at the input terminal 1300 in conjunction with a high-going clock pulse at clock terminal 1302. That is, when the clock signal at terminal 1302 goes to a logic high, the complement of the data at input terminal 1300 appears at output terminal 1304. When the clock signal at terminal 1302 goes low, the data at output terminal 1304 remains unchanged (i.e. it is stored for the logic low portion of the clock cycle). On the next high-going clock cycle the complement of the data at input terminal 1300 then appears on the output terminal 1304 as before.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, where logic circuitry in the embodiments was described in terms of normal logic, one skilled in the art will appreciate that the circuits could have been implemented in reverse logic as well. In addition, the embodiments discussed herein were implemented in CMOS logic. The skilled artisan will appreciate that the circuits may be implemented in non-complementary MOS logic as well as with bipolar logic. It is therefore intended that the appended claims encompass any such modifications or embodiments.

What is claimed is:

1. A clock circuit, comprising:

an input terminal for receiving a clock signal;

a first pulse generator coupled to said input terminal, said first pulse generator operable to generate a voltage pulse in response to a logic-low voltage to logic-high voltage transition of said clock signal;

a second pulse generator coupled to said input terminal, said second pulse generator operable to generate a voltage pulse in response to a logic-high voltage to logic-low voltage transition of said clock signal;

a first clock deskewing circuit coupled between said first pulse generator and a first clock signal output terminal; and a second clock deskewing circuit coupled between said second pulse generator and a second clock signal output terminal.

2. The clock circuit of claim 1, further comprising:

an OR logic circuit coupled to said first and second clock signal output terminals; and a third pulse generator coupled to said OR logic circuit, said third pulse generator having a third clock signal output terminal.

3. The clock circuit of claim 1, wherein said first and second clock deskewing circuits comprise:

a first delay circuit having an input terminal and a plurality of output terminals;

a second delay circuit having a plurality of input terminals and an output terminal; and a control circuit coupling each of said plurality of output terminals of said first delay circuit to a corresponding one of said plurality of input terminals of said second delay circuit.

4. The clock circuit of claim 3, wherein said first and second delay circuits comprise serial-coupled logic gates.

5. The clock circuit of claim 1, wherein said first pulse generator comprises:

a clock signal input terminal;

a NAND gate having first and second input terminals and an output terminal, said first input terminal coupled to said clock signal input terminal;

a first inverter coupled between said clock signal input terminal and said second input terminal of said NAND gate;

a clock signal output terminal; and a second inverter coupled between said NAND gate output terminal and said clock signal output terminal.

6. The clock circuit of claim 1, wherein said second pulse generator comprises:

a clock signal input terminal;

a NOR gate having first and second input terminals and an output terminal, said first input terminal coupled to said clock signal input terminal; and an inverter coupled between said clock signal input terminal and said second input terminal of said NOR gate.

7. An integrated circuit, comprising:

an input terminal for receiving a clock signal;

a first pulse generator coupled to said input terminal, said first pulse generator operable to generate a voltage pulse in response to a logic-low voltage to logic-high voltage transition of said clock signal;

a second pulse generator coupled to said input terminal, said second pulse generator operable to generate a voltage pulse in response to a logic-high voltage to logic-low voltage transition of said clock signal;

first clock deskewing circuit coupled between said first pulse generator and a first clock signal output terminal; and a second clock deskewing circuit coupled between said second pulse generator and a second clock signal output terminal.

8. The integrated circuit of claim 7, further comprising:

an OR logic circuit coupled to said first and second clock signal output terminals; and a third pulse generator coupled to said OR logic circuit, said third pulse generator having a third clock signal output terminal.

9. The integrated circuit of claim 8, further comprising a data transfer circuit coupled to said third clock signal output terminal.

10. The integrated circuit of claim 7, wherein said first and second clock deskewing circuits comprise:

a first delay circuit having an input terminal and a plurality of output terminals;

a second delay circuit having a plurality of input terminals and an output terminal; and a control circuit coupling each of said plurality of output terminals of said first delay circuit to a corresponding one of said plurality of input terminals of said second delay circuit.

11. The integrated circuit of claim 7, wherein said first pulse generator comprises:

a clock signal input terminal;

a NAND gate having first and second input terminals and an output terminal, said first input terminal coupled to said clock signal input terminal;

a first inverter coupled between said clock signal input terminal and said second input terminal of said NAND gate;

a clock signal output terminal; and a second inverter coupled between said NAND gate output terminal and said clock signal output terminal.

12. The integrated circuit of claim 7, wherein said first pulse generator comprises:

a clock signal input terminal;

a NOR gate having first and second input terminals and an output terminal, said first input terminal coupled to said clock signal input terminal; and an inverter coupled between said clock signal input terminal and said second input terminal of said NOR gate.

13. A dynamic random access memory integrated circuit, comprising:

an input terminal for receiving an external clock signal;

a first pulse generator coupled to said input terminal, said first pulse generator operable to generate a first internal clock signal in response to a logic-low voltage to logic-high voltage transition of said external clock signal;

a second pulse generator coupled to said input terminal, said second pulse generator operable to generate a second internal clock signal in response to a logic-high voltage to logic-low voltage transition of said external clock signal;

a first clock deskewing circuit coupled between said first pulse generator and a first clock signal output node;

a second clock deskewing circuit coupled between said second pulse generator and a second clock signal output node;

a logic circuit coupled to said first and second clock signal output nodes, said logic circuit combining said first and second internal clock signals to produce a third internal clock signal;

a third pulse generator coupled to said logic circuit to receive said third internal clock signal, said third pulse generator operable to produce a fourth internal clock signal at an internal clock signal output terminal in response to transitions in said third internal clock signal from a first logic voltage to a second logic voltage; and an output circuit for controlling the transfer of data out of said memory integrated circuit, said output circuit responsive to said fourth internal clock signal in said transfer of data.

14. The integrated circuit of claim 13, wherein said logic gate comprises an OR logic circuit.

15. The integrated circuit of claim 14, wherein said OR logic circuit comprises a NOR gate and an inverter.

16. The integrated circuit of claim 13, wherein said first and second clock deskewing circuits comprise:

a first delay circuit having an input terminal and a plurality of output terminals;

a second delay circuit having a plurality of input terminals and an output terminal; and a control circuit coupling each of said plurality of output terminals of said first delay circuit to a corresponding one of said plurality of input terminals of said second delay circuit.

17. The integrated circuit of claim 13, wherein said first pulse generator comprises:

a clock signal input terminal;

a NAND gate having first and second input terminals and an output terminal, said first input terminal coupled to said clock signal input terminal;

a first inverter coupled between said clock signal input terminal and said second input terminal of said NAND gate;

a clock signal output terminal; and second inverter coupled between said NAND gate output terminal and said clock signal output terminal.

18. The integrated circuit of claim 13, wherein said first pulse generator comprises:

a clock signal input terminal;

a NOR gate having first and second input terminals and an output terminal, said first input terminal coupled to said clock signal input terminal; and an inverter coupled between said clock signal input terminal and said second input terminal of said NOR gate.

* * * * *